United States Patent [19]

Lew

[11] Patent Number: 5,509,311
[45] Date of Patent: Apr. 23, 1996

[54] DYNAMICALLY ISOLATED VORTEX SENSING PRESSURE TRANSDUCER

[76] Inventor: Hyok S. Lew, 7890 Oak St., Arvada, Colo. 80005

[21] Appl. No.: 283,566

[22] Filed: Aug. 1, 1994

Related U.S. Application Data

[63] Continuation-in-part of Ser. No. 280,216, Jul. 25, 1994, Pat. No. 5,503,021, Ser. No. 248,354, May 24, 1994, and Ser. No. 34,516, Mar. 19, 1993, Pat. No. 5,456,116, which is a continuation-in-part of Ser. No. 772,964, Oct. 8, 1991, Pat. No. 5,214,965, and a continuation of Ser. No. 860,767, Mar. 23, 1992, abandoned.

[51] Int. Cl.$^6$ ........................................... G01F 1/32
[52] U.S. Cl. ............................... 73/661; 73/861.21
[58] Field of Search ................. 73/861.21, 861.22, 73/861.24

[56] References Cited

U.S. PATENT DOCUMENTS

| | | | |
|---|---|---|---|
| 3,979,565 | 9/1976 | McShane | 179/110 A |
| 4,891,990 | 1/1990 | Khalifa et al. | 73/861.24 |
| 5,060,522 | 10/1991 | Lew | 73/861.02 |
| 5,123,285 | 6/1992 | Lew | 73/861.22 |

Primary Examiner—Richard Chilcot
Assistant Examiner—Jewel V. Artis

[57] ABSTRACT

A vortex flowmeter employs a differential pressure transducer converting an oscillation in a differential pressure to an alternating electrical signal, which differential pressure transducer is dynamically isolated from a structure including a flow passage in a relationship preventing the transmission of the mechanical vibrations of the structure including the flow passage to the differential pressure transducer, and receives two fluid pressures respectively existing at the two opposite cylindrical sides of a vortex generating bluff body disposed across the flow passage respectively through two small diameter tubings having a low stiffness, wherein the velocity of fluid moving through the flow passage is determined as a function of the frequency of the alternating electrical signal generated by the differential pressure transducer.

20 Claims, 2 Drawing Sheets

5,509,311

DYNAMICALLY ISOLATED VORTEX SENSING PRESSURE TRANSDUCER

This patent application is a Continuation-In-Part to a Patent Application Ser. No. 08/280,216 entitled "Oscillatory Pressure Sensor" filed on Jul. 25, 1994, now U.S. Pat. No. 4,803,021 and to patent application Ser. Nos. 08/248,354 entitled "Oscillatory Pressure Transducer" filed on May 24, 1994 and 08/034,516 entitled "Piezo Electric Relative Vibration Sensor" filed on Mar. 19, 1993, now U.S. Pat. No. 5,456,116 that is a Continuation-In-Part to patent application Ser. No. 07/772,964, filed Oct. 8, 1991 now U.S. Pat. No. 5,214,965 and a Continuation to patent application Ser. No. 07/860,767, filed Mar. 23, 1992 now abandoned.

FIELD OF INVENTION

This invention relates to a vortex flowmeter employing a differential pressure transducer detecting the differential pressure across the two opposite cylindrical sides of a vortex generating bluff body disposed across a flow passage, which differential pressure transducer is disposed in a dynamically isolated relationship from the mechanical vibrations of the conduit providing the flow passage, and receives two fluid pressures respectively existing at the two opposite cylindrical sides of the vortex generating bluff body respectively through two small diameter tubings having a low stiffness.

BACKGROUND OF THE INVENTION

In an earlier invention made by the inventor of the present invention, that has been disclosed in U.S. Pat. No. 5,214,965, a vortex flowmeter employing a differential pressure transducer detecting an oscillation in the differential pressure across the two opposite cylindrical sides of a vortex generating bluff body disposed across a flow passage generates an alternating electrical signal representing the vortex shedding from the bluff body, wherein the velocity or volume flow rate of fluid moving through the flow passage is determined as a function of the frequency of the alternating electrical signal. Experiments with and testing of the above-mentioned vortex flowmeter have shown that, in general, the particular type of differential pressure transducer included in the above-mentioned flowmeter or other types of pressure transducers used as a vortex sensor works best, particularly in noisy and vibratory environments, when the differential pressure transducer is disposed in a dynamically isolated relationship from the mechanical vibrations of the pipe line or conduit providing the flow passage, and receives two fluid pressures existing in regions respectively adjacent to the two opposite cylindrical sides of the vortex generating bluff body respectively through two small diameter tubings having a low stiffness or a high flexibility.

BRIEF SUMMARY OF INVENTION

The primary object of the present invention is to provide a vortex flowmeter comprising a flow passage with a vortex generating bluff body disposed thereacross, and a differential pressure transducer receiving two fluid pressures existing in two regions respectively adjacent to the two opposite cylindrical sides of the vortex generating bluff body respectively through two small diameter tubings having a low stiffness or a high flexibility, wherein the differential pressure transducer is disposed in a structural arrangement dynamically isolating the differential pressure transducer from the mechanical vibrations of the pipe line or conduit providing the flow passage and from the acoustic noise existing in the ambient surroundings.

Another object is to provide the differential pressure transducer enclosed within an acoustically insulating enclosure blocking the transmission of the acoustic noise existing in the ambient surroundings.

A further object is to provide the differential pressure transducer secured to a supporting structure structurally isolated from the vibrations of the pipe line or conduit providing the flow passage.

Yet another object is to provide the differential pressure transducer supported by the pipe line of conduit providing the flow passage in a structural relationship including a dynamic insulator intermediate the differential pressure transducer and the pipe line or conduit providing the flow passage.

These and other objects of the present invention will become clear as the description of the invention progresses.

BRIEF DESCRIPTION OF FIGURES

The present invention may be described with a greater clarity and specificity by referring to the following figures.

DESCRIPTION OF ILLUSTRATED EMBODIMENTS

Figure 1:
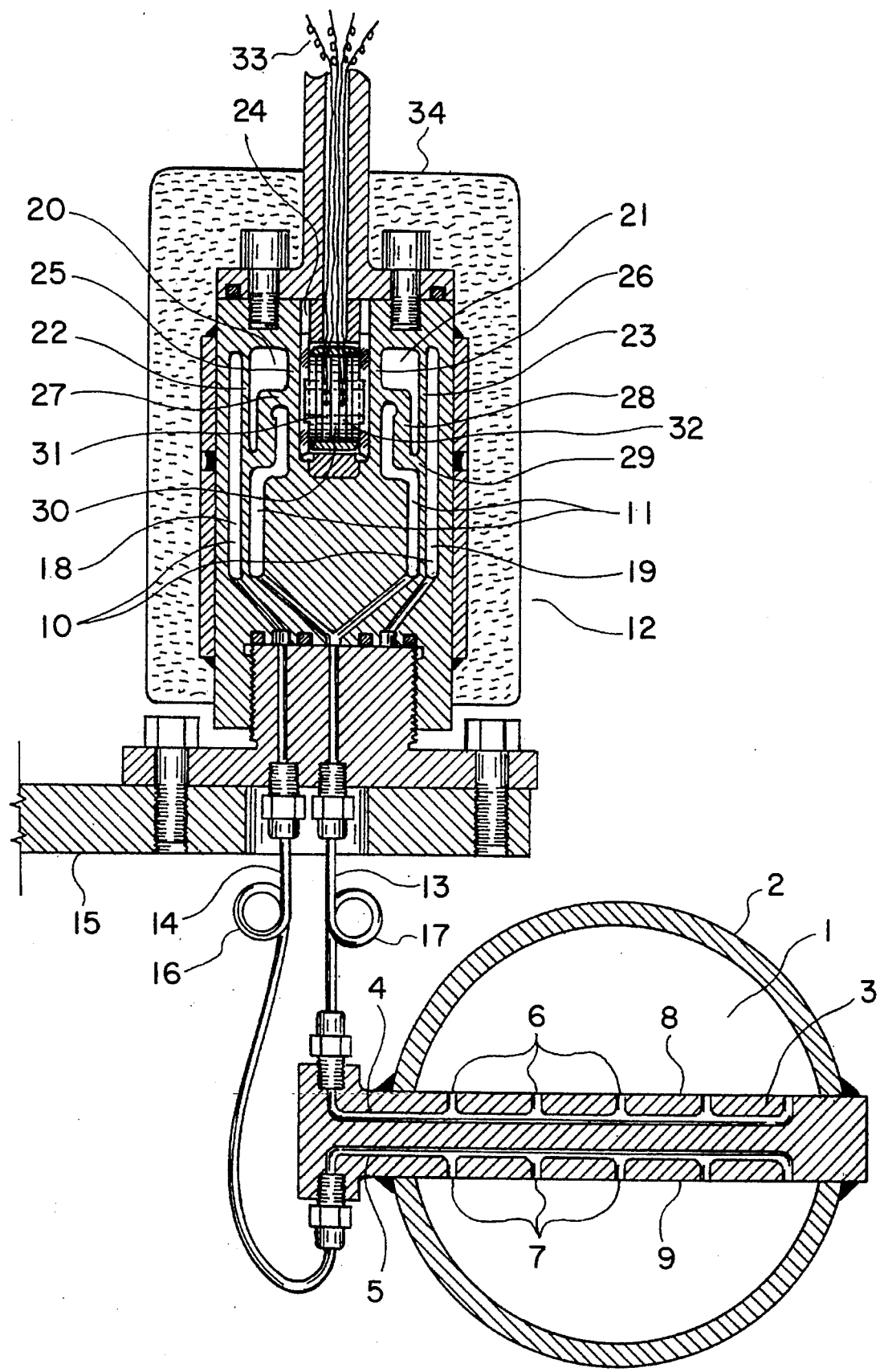
FIG. 1 illustrates an embodiment of the vortex flowmeter of the present invention.

In FIG. 1 there is illustrated a cross section of a vortex flowmeter constructed in accordance with the principles of the present invention. A flow passage 1 provided by a pipe or conduit 2 includes a vortex generating bluff body 3 of elongated cylindrical shape disposed across the flow passage 1, which vortex generating bluff body 3 has two pressure transmitting holes 4 and 5 respectively having two sets 6 and 7 of pressure receiving holes respectively open to the two opposite cylindrical sides 8 and 9 of the bluff body 3. The two fluid pressures existing in regions respectively adjacent to the two opposite cylindrical sides 8 and 9 of the bluff body 3 and tapped respectively through the two sets 6 and 7 of the pressure receiving holes are introduced respectively into two pressure compartments 10 and 11 included in an oscillatory differential pressure transducer 12 respectively through two small diameter conduits or tubings 13 and 14 having a low stiffness or a high flexibility. It should be noticed that the differential pressure transducer 12 is mounted on a rigid and massive supporting structure 15, and the two pressure transmitting conduits or tubings 13 and 14 having a small diameter and low stiffness respectively includes looped portions 16 and 17, whereby the differential pressure transducer 12 is structurally isolated from the pipe line or conduit 2 in such a way that the structural vibrations of the pipe line or conduit 2 are not transmitted or propagated to the differential pressure transducer 12. The first pressure compartment 10 comprises two planar cavities 18 and 19, while the second pressure compartment 11 comprises two planar cavities 20 and 21. A first thin deflective planar member 22 separates the two planar cavities 18 and 20 from one another, and a second thin deflective planar member 23 separates the two planar cavities 19 and 21 from one another. A cavity 24 containing a piezo electric transducer assembly has two opposite thin walls 25 and 26 disposed parallel to one another and straddling a reference plane perpendicularly intersecting therewith. Each of the two opposite thin walls 25 and 26 includes a reinforcing rib 27 disposed diametrically thereacross on the reference plane, and a force transmitting member 28 extending from the thin wall anchored to the reinforcing rib 27 at one extremity and connected to a deflective portion 29 of each of the two thin deflective planar members 22 and 23. The differential pressure created by vortex shedding from the two opposite cylindrical sides 8 and 9 of the bluff body 3 in an alternating manner creates a relative vibratory deflection between the two thin deflective planar members 22 and 23, which in turn creates minute vibratory pivotal motions of the two opposite thin walls 25 and 26 in two opposite directions respectively about two pivot axes, each of which two pivot axes is defined by the line of intersection between the thin wall and the reinforcing rib of the thin wall. The piezo electric transducer assembly contained within the cavity 24 comprises a piezo electric disc 30 sandwiched between a pair of electrode discs 31 and 32, which combination of stacked assembly is disposed intermediate the two opposite thin walls 25 and 26 in a relationship being compressed by the two opposite thin walls 25 and 26, and straddling the reference plane including the reinforcing ribs 27. Each of the pair of electrode discs 31 and 32 is split along the reference plane into two semicircular electrodes respectively located on two opposite sides of the reference plane. The plurality of lead wires 33 respectively extend from the semicircular electrodes. An alternating electrical signal representing the vortex shedding from the bluff body 3 is obtained by amplifying and combining two electrical signals respectively supplied by two semicircular electrodes respectively located on two opposite sides of the reference plane. The differential pressure transducer 12 may be enclosed within an acoustically insulating enclosure 34 cutting off transmission of acoutical vibrations from the ambient surroundings to the differential pressure transducer 12.

It must be mentioned and emphasized that the novel features of the present invention exemplified by the embodiment shown in FIG. 1 are, firstly, the dynamic isolation of the differential pressure transducer, that is provided by a supporting structure experiencing zero or little vibration and structurally isolated from the pipe line or conduit providing the flow passage, and secondly, the transmission of the fluctuating fluid pressures associated with the vortex shedding through two small diameter conduits or tubings having a low stiffness or high flexibility, which low stiffness or high flexibility of conduits prevent the transmission of the structural vibration of the pipe line or conduit providing the flow passage to the differential pressure transducer generating the alternating electrical signal representing the vortex shedding. It should be understood that only one of the two fluid pressures supplied to the differential pressure transducer 12 may be tapped from a region adjacent to one of the two cylindrical sides 8 and 9 of the bluff body 3, while the other of the two fluid pressures is tapped from a region upstream of or remote from the bluff body. It should be further understood that one or both of the two fluctuating fluid pressures associated with the vortex shedding may be tapped through one or two conduits extending through the wall of the pipe or conduit 2 and terminated at a region or regions in the fluid other than the two opposite cylindrical sides 8 and 9 of the bluff body 3, whereat the fluid pressure fluctuates as a result of the vortex shedding. In practicing the afore-mentioned two principles of the present invention, which are the dynamic isolation of the differential pressure transducer from the pipe line vibration and the supplying of the fluid pressures to the differential pressure transducer through small diameter tubings having a low stiffness or high flexibility, other versions of the differential pressure transducer not shown in the illustrative embodiments and well known in the art of pressure sensing may be employed in place of the particular differential pressure transducer shown and described, in conjunction with the particular version of the fluid pressure tapping embodiment shown and described, or in conjunction with other versions not shown in the illustrative embodiments and well known in the art of vortex sensing such as the pressure tapping tubing or conduit extending through the wall of the pipe and terminated at a region in the fluid different from the immediate vicinity of the bluff body.

Figure 2:
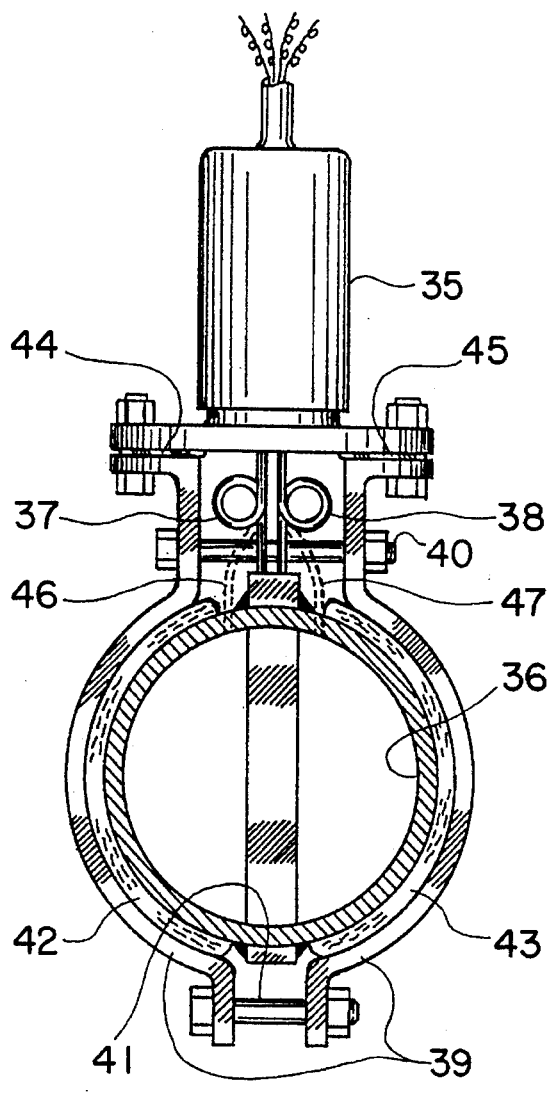
FIG. 2 illustrates another embodiment of the vortex flowmeter of the present invention.

In FIG. 2 there is illustrated another embodiment of the vortex flowmeter employing a differential pressure transducer 35, which may be the type employed in the embodiment shown in FIG. 1 or other types, that is dynamically isolated from the structural vibrations of the pipe line 36, and receives the fluid pressures associated with the vortex shedding through two small diameter tubings or conduits 37 and 38 having a low stiffness or high flexibility. This particular embodiment shows an alternative to the embodiment shown in FIG. 1 in dynamically isolating the differential pressure transducer 35 from the structural vibrations of the pipe line 36. The yoke or collar structure 39 mounting the differential pressure transducer 35 on the pipe line 36 is mechanically secured to the pipe line 36 by a plurality of clamping bolt and nuts 40, 41, etc. and dynamically insulated from the pipe line 36 by vibration absorbing collars 42 and 43 made of a polymer material absorbing and dissipating mechanical vibrations. The mechanical joint between the differential pressure transducer 35 and the yoke or collar structure 39 further includes dynamically insulating washers or spacers 44 and 45. The alternative routing of the pressure transmitting tubings 37 and 38 respectively shown in two broken outlines 46 and 47, illustrates a modified version of tapping the fluctuating fluid pressures associated with the vortex shedding. While the particular illustrative embodiment shows the differential pressure transducer 35 mounted on the pipe line 36 in an up-right position, it can be hung on the pipe line in a hanging-down position illustrated by an upside-down version of FIG. 2.

Figure 3:
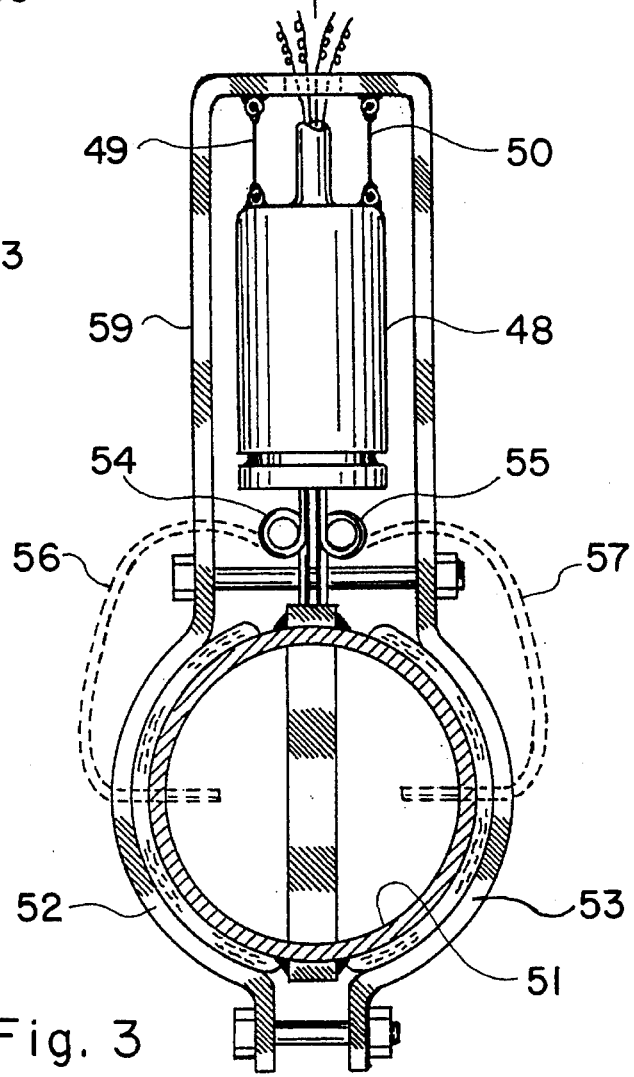
FIG. 3 illustrates a further embodiment of the vortex flowmeter of the present invention.

In FIG. 3 there is illustrated a further embodiment of the vortex flowmeter comprising a dynamically insulated differential pressure transducer. In this particular illustrative embodiment, the differential pressure transducer 48 is suspended by one or a plurality of flexible elongated members 49 and 50 from a yoke or collar structure 50 secured to the pipe line 51 and dynamically insulated therefrom by the vibration absorbing and dissipating collars 52 and 53. It is readily realized that, in an alternative design, the differential pressure transducer 48 can be suspended directly from the pipe line 51 or from a saddle structure mounted on the pipe line 51 by one or a plurality of vibration absorbing and dissipating flexible elongated members. The modified routings of the pressure transmitting tubings 54 and 55 shown in two broken outlines 56 and 57 illustrates another alternative for tapping the fluctuating fluid pressures associated with the vortex shedding, wherein the open extremity of the pressure transmitting tubings 56 and 57 extending into the stream of fluid moving through the pipe line 51 may point in directions perpendicular, parallel, or angled to the direction of fluid flow.

The alternating electrical signal generated by the differential pressure transducer and representing the vortex shedding is supplied to a data processor such as the element 58 included in the embodiment shown in FIG. 3, which data processor determines the fluid velocity or the volume flow rate V of the fluid moving through the flow passage as a function of the frequency of the alternating electrical signal generated by the differential pressure transducer, as the fluid velocity is proportional to the frequency of the alternating electrical signal. The amplitude of oscillation in the differential pressure associated with the vortex shedding is proportional to the dynamic pressure of the fluid flow, that is equal to one half of the fluid density times the square of the fluid velocity. Consequently, the amplitude of the alternating electrical signal generated by the differential pressure transducer is also proportional to the dynamic pressure of the fluid flow. The data processor may also determine the mass flow rate M of the fluid as a ratio of the amplitude to the frequency of the alternating electrical signal. Of course, the density ρ of the fluid can be determined as the ratio of the mass flow rate to the volume flow rate of the fluid. A brief investigation of the construction and operating principles of the differential pressure transducer included in the embodiment shown in FIG. 1 reveals a fact that the differential pressure transducer still works even when one of the two pressure compartments is sealed off and the combination of one of the two sets of pressure receiving holes and one of the two pressure transmitting conduits or tubings supplying the fluid pressure to the now sealed off pressure compartment is omitted. Such a simplified version of the embodiment shown in FIG. 1 may be used as an economic model in applications requiring the sensitivity of the apparatus at a reduced level. It should be pointed out that the implementation of the principles of the present invention exemplified by the illustrative embodiments in the practice of the vortex flowmeter technology makes it possible to measure the velocity or the volume flow rate of fluid accurately and reliably by using a vortex flowmeter under all working environments and operating conditions including applications subjected to very violent pipe line vibrations and extremely high ambient acoustic noise.

While the principles of the present inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the invention without departing from those principles. It is not desired to limit the inventions to the particular illustrative embodiments shown and described and accordingly, all suitable modifications and equivalents may be regarded as falling within the scope of the inventions as defined by the claims which follow.

The embodiments of the invention, in which an exclusive property or privilege is claimed, are defined as follows:

1. An apparatus for measuring flow rate of fluid comprising in combination:

a) a flow passage;

b) means for generating vortices in a stream of fluid moving through the flow passage;

c) means for converting an oscillation in fluid pressure to an alternating electrical signal; and d) at least one pressure communicating hole with one end exposed to a fluctuating fluid pressure associated with generation of vortices by said means for generating vortices and the other end connected to a pressure compartment included in said means for converting an oscillation in fluid pressure to an alternating electrical signal, wherein at least a portion of said at least one pressure communicating hole includes a conduit with low stiffness disposed intermediate said flow passage and said means for converting an oscillation in fluid pressure to an alternative electrical signal; wherein the fluctuating fluid pressure generates the alternating electrical signal.

2. An apparatus as defined in claim 1 wherein said combination includes means for determining velocity of fluid moving through the flow passage as a function of a frequency of the alternating eletrical signal provided by said means for converting.

3. An apparatus as defined in claim 1 wherein said means for converting is dynamically isolated from a structure including the flow passage in a relationship wherein transmission of mechanical vibrations of the structure including the flow passage to said means for converting is substantially prevented.

4. An apparatus as defined in claim 3 wherein said combination includes means for determining velocity of fluid moving through the flow passage as a function of a frequency of the alternating electrical signal provided by said means for converting.

5. An apparatus as defined in claim 3 wherein said means for converting is disposed within an acoustically insulating enclosure in a relationship wherein transmission of acoustic noise existing in ambient surroundings to said means for converting is substantially prevented.

6. An apparatus as defined in claim 5 wherein said combination includes means for determining velocity of fluid moving through the flow passage as a function of a frequency of the alternating electrical signal provided by said means for converting.

7. An apparatus as defined in claim 1 wherein said means for converting is supported by a structure including the flow passage in a relationship wherein transmission of mechanical vibrations of the structure including the flow passage to said means for converting is substantially prevented.

8. An apparatus as defined in claim 7 wherein said combination includes means for determining velocity of fluid moving through the flow passage as a function of a frequency of the alternating electrical signal provided by said means for converting.

9. An apparatus as defined in claim 7 wherein said means for converting is disposed within an acoustically insulating enclosure in a relationship wherein transmission of acoustic noise existing in ambient surroundings to said means for converting is substantially prevented.

10. An apparatus as defined in claim 9 wherein said combination includes means for determining velocity of fluid moving through the flow passage as a function of a frequency of the alternating electrical signal provided by said means for converting.

11. An apparatus for measuring flow rate of fluid comprising in combination:

a) a flow passage;

b) means for generating vortices in a stream of fluid moving through the flow passage;

c) means for converting an oscillation in differential pressure to an alternating electrical signal;

d) a first pressure communicating hole with one end exposed to a first fluid pressure and the other end connected to a first pressure compartment included in said means for converting an oscillation in differential pressure to an alternating,electrical signal, wherein at least a portion of the first pressure communicating hole include a conduit with low stiffness disposed intermediate the flow passage and said means for converting an oscillation in differential pressure to an alternating electrical signal, and a second pressure communicating hole with one end exposed to a second fluid pressure and the other end connected to a second pressure compartment included in said means for converting an oscillation in differential pressure to an alternating electrical signal, wherein at least a portion of the second pressure communicating hole includes a conduit with low stiffness disposed intermediate the flow passage and said means for converting an oscillation in differential pressure to an alternating electrical signal; wherein an oscillation in differential pressure between the first and second fluid pressures is associated with generation of vortices by said means for generating vortices, and the oscillation in differential pressure between the first and second fluid pressures generates the alternating electrical signal.

12. An apparatus as defined in claim 11 wherein said combinations includes means for determining velocity of fluid moving through the flow passage as a function of a frequency of the alternating electrical signal provided by said means for converting.

13. An apparatus as defined in claim 11 wherein said means for converting is dynamically isolated from a structure including the flow passage in a relationship wherein transmission of mechanical vibrations of the structure including the flow passage to said means for converting is substantially prevented.

14. An apparatus as defined in claim 13 wherein said combination includes means for determining velocity of fluid moving through the flow passage as a function of a frequency of the alternating electrical signal provided by said means for converting.

15. An apparatus as defined in claim 13 wherein said means for converting is disposed within an acoustically insulating enclosure in a relationship wherein transmission of acoutic noise existing in ambient surroundings to said means for converting is substantially prevented.

16. An apparatus as defined in claim 15 wherein said combination includes means for determining velocity of fluid moving through the flow passage as a function of a frequency of the alternating electrical signal provided by said means for converting.

17. An apparatus as defined in claim 11 wherein said means for converting is supported by a structure including the flow passage in a relationship wherein transmission of mechanical vibrations of the structure including the flow passage to said means for converting is substantially prevented.

18. An apparatus as defined in claim 17 wherein said combination includes means for determining velocity of fluid moving through the flow passage as a function of a frequency of the alternating electrical signal provided by said means for converting.

19. An apparatus as defined in claim 17 wherein said means for converting is disposed within an acoustically insulating enclosure in a relationship wherein transmission of acoustic noise existing in ambient surroundings to said means for converting is substantially prevented.

20. An apparatus as defined in claim 19 wherein said combination includes means for determining velocity of fluid moving through the flow passage as a function of a frequency of the alternating electrical signal provided by said means for converting.

* * * * *